United States Patent [19]

Cadotte

[11] Patent Number: 4,960,517

[45] Date of Patent: Oct. 2, 1990

[54] TREATMENT OF COMPOSITE POLYAMIDE MEMBRANES VIA SUBSTITUTION WITH AMINE REACTIVE REAGENTS

[75] Inventor: John E. Cadotte, Minnetonka, Minn.

[73] Assignee: Filmtec Corporation, Minneapolis, Minn.

[21] Appl. No.: 450,705

[22] Filed: Dec. 13, 1989

[51] Int. Cl.$^5$ ............................................. B01D 61/02
[52] U.S. Cl. ................................. 210/639; 210/651; 210/652; 210/500.38
[58] Field of Search ............... 210/634, 638, 639, 644, 210/649, 650–654, 500.1, 500.21, 500.23, 500.27, 500.37, 500.38

[56] References Cited

U.S. PATENT DOCUMENTS

| | | | |
|---|---|---|---|
| 4,277,344 | 7/1981 | Cadotte | 210/654 |
| 4,705,636 | 11/1987 | Small et al. | 210/638 |
| 4,812,238 | 8/1987 | Schmidt | 210/636 |
| 4,814,399 | 7/1987 | Sansone et al. | 525/435 |
| 4,828,708 | 5/1989 | Bray | 210/654 |

FOREIGN PATENT DOCUMENTS 135506  5/1989  Japan .

OTHER PUBLICATIONS

Technical Bulletin; Filmtec; "FT30 Reverse Osmosis Membrane Biological Protection and Disinfection"; Jan. 1988.
Copending Patent Applications 07/450,691 & 07/450,706.

Primary Examiner—Frank Sever

[57] ABSTRACT

A reverse osmosis membrane having improved rejection of sulfuric acid and/or isopropanol is described. The membrane is prepared by treating a crosslinked, polyamide discriminating layer with an amine-reactive reagent selected from a carboxylic acid ester, a carboxylic acid anhydride, an amine-reactive organic halogen compound, an ethylenically unsaturated hydrocarbon, or a 1,3-propane sultone, at conditions whereby the passage of sulfuric acid in a 2 percent aqueous solution at a transmembrane pressure of 400 psi is reduced by at least 30 percent.

22 Claims, No Drawings

TREATMENT OF COMPOSITE POLYAMIDE MEMBRANES VIA SUBSTITUTION WITH AMINE REACTIVE REAGENTS

BACKGROUND OF THE INVENTION

This invention relates to treatment of composite polyamide reverse osmosis membranes. More specifically, treatment of polyamide membranes to enhance rejection of certain acids and organic materials in a reverse osmosis process is contemplated.

Removal of materials dissolved or dispersed in a solution by separation of these materials from the dispersing medium or solvent utilizing reverse osmosis membranes is well known. The membranes used for reverse osmosis are selectively permeable to certain components of the mixture to be separated. Generally, water is the component to which such membranes are especially permeable. An aqueous feed solution is conveniently brought in contact with one surface of the reverse osmosis membrane under pressure so as to effect selective permeation of water through the membrane. This process is most generally used for desalination of water-containing salts. However, reverse osmosis has also been used to separate organic compounds and other materials from aqueous feed solutions.

The performance of reverse osmosis membranes has a critical effect on the efficiency and efficacy of reverse osmosis processes. Advantageously, the reverse osmosis membrane should be relatively impermeable to materials which are to be separated from the water and highly permeable to water. It has been found that membranes having a porous support which provides physical strength but imparts little or no rejection, combined with a thin discriminating layer adherent to the support, are particularly useful. Such membranes are commonly referred to as thin film composite membranes.

Polyamide membranes have been widely employed in reverse osmosis processes. U.S. Pat. No. 4,277,344 describes a variety of membranes having a polyamide discriminating layer on a porous support. These membranes are preferably prepared by interfacial polymerization of a difunctional aromatic amine such as metaphenylene diamine and a trifunctional aromatic acyl halide, such as trimesoyl chloride, optionally containing a difunctional acyl halide. A 1,3,5-cyclohexane tricarbonyl chloride can also be employed as the acyl halide reactant. Such membranes are further illustrated in U.S. Pat. Nos. 4,520,044 and 4,606,943. European Patent Application Publication No. 211,633 also describes composite polyamide membranes.

The treatment of membranes to enhance performance is described in the prior art in a number of patents. U.S. Pat. No. 3,551,331 describes a process for modifying the permeability of a substantially linear aliphatic polyamide membrane. In this process, the polyamide membrane is treated with a protonic acid, lyotropic salt or a Lewis acid.

U.S. Pat. No. 3,877,978 describes use of copolymers of vinyl acetate with various ethylenically unsaturated carboxylic acids to enhance the rejection of certain semi-permeable membranes.

U.S. Pat. No. 3,886,066 discloses the use of hydrolyzable tannins to reduce the salt passage through semi-permeable membranes.

U.S. Pat. No. 3,904,519 describes treatment of linear aromatic polyamides with certain crosslinking reagents to improve flux or flux stability of the resulting membranes. Crosslinking reagents employed include aldehydes, polyamines, polycarboxylic acids, polyisocyanates, oxidizing agents, peroxides and other compounds.

U.S. Pat. No. 3,951,815 describes a composite semipermeable membrane formed of an ultrathin film of polyethylenimine on a support, where said film has been crosslinked with difunctional or trifunctional acyl halides, chloroformates, isocyanates and sulfonyl chlorides.

U.S. Pat. No. 4,214,020 describes a process for coating exteriors of hollow fiber membranes to enhance their membrane characteristics.

U.S. Pat. No. 4,634,531 describes the use of sequential treatment with a water-soluble amine and a water-soluble aldehyde to improve selective permeation.

U.S. Pat. No. 4,704,324 teaches preparation of membranes by reaction of a nucleophilic first compound with a second compound bearing reactive onium groups.

U.S. Pat. No. 4,812,238 describes the treatment of composite polyamide membranes with nitrous acid or a diazonium compound. The nitrous acid is disclosed to react with pendant amine groups.

U.S. Pat. No. 4,828,700 discloses that reverse osmosis membranes can be treated with polymers bearing carboxylic acid groups and optionally pendant hydroxyl or amide moieties to enhance salt rejection.

Existing commercial composite polyamide membranes display a good combination of high water flux, good salt rejection and acceptable chemical stability. Membranes which are more tolerant of acidic or basic conditions and which demonstrate a higher rejection for organic materials while maintaining high water flux are still sought.

SUMMARY OF THE INVENTION

A method of treating a composite, crosslinked polyamide reverse osmosis membrane to enhance rejection of certain organic compounds and sulfuric acid has now been discovered. This method comprises contacting a composite membrane having a crosslinked polyamide discriminating layer with a solution of an effective amount of an amine-reactive reagent which reacts by substitution on the amine, said reagent selected from the group consisting of an alkylating, amine-reactive organic halogen compound, a carboxylic acid anhydride, a carboxylic acid ester, a 1,3-heterocyclic sultone having 3 carbons in the ring (such as 1,3-propane sultone), or an amine-reactive ethylenically-unsaturated compound, whereby the passage through the membrane of sulfuric acid in a two percent aqueous solution at 400 psig and 25° C. is reduced by at least about 30 percent, more preferably at least about 50 percent, relative to the membrane prior to treatment and the water flux of said membrane is reduced by not more than about 50 percent, preferably not more than about 40 percent, after treatment.

In another aspect, the invention is a composite crosslinked polyamide membrane which has been treated by the method described hereinbefore. This treated membrane possesses novel properties in its combination of excellent water flux and high rejection of solutes which have a solute passage through the membrane at least twice that of sodium chloride at like conditions. Surprisingly, it has been found that such treated membranes exhibit higher rejection than the membrane prior to treatment with minimum loss of flux in separation of water from aqueous sulfuric acid or other solutes of high passage relative to sodium chloride.

DETAILED DESCRIPTION OF THE INVENTION

Composite reverse osmosis membranes having crosslinked polyamide discriminating layers are well-known. The discriminating layer is advantageously derived from reactants comprising: (a) a compound or polymer bearing at least two primary amine groups and (b) a compound or polymer bearing an average of more than two carboxylic acyl halide groups. The amine and acid halide reactants may be aliphatic, cycloaliphatic or aromatic. Aromatic amines, that is compounds wherein one or more amine groups are bonded to a carbon atom in an aromatic ring, are especially preferred. The amine compound may contain one or two fused or separate aromatic rings in preferred embodiments.

The carboxylic acid halide reactant employed to prepare the polyamide discriminating layer desirably includes an aromatic acyl halide bearing at least three acyl halide groups. The carboxylic acid halide reactant may comprise some compounds or polymers which are difunctional. Preferably, at least 50 mole percent of the carboxylic acid halide reactant is trifunctional or more highly functionalized. The compound bearing the two acyl halide groups optionally bear other substituents which do not interfere with the reaction forming the membrane. Preferably, the carboxylic acid halide is trimesoyl halide. Advantageously, the carboxylic acid halide reactant is trimesoyl halide or cyclohexane-1,3,5-tricarbonyl halide or mixtures of these trifunctional halides. Optionally, isophthaloyl halide and/or terephthaloyl halide may be employed with one or both of the trifunctional halides. The halide is preferably chloride, but may be bromide.

The aromatic amine compound optionally may bear other substituents which do not interfere with the membrane formation reaction. For example, a compound bearing two primary amine groups and one group which has a carbonyl function not adjacent to the amine group, as described in U.S. Pat. No. 4,761,234, may be employed, but is not preferred. The preferred amine reactant employed to form the membrane is phenylene diamine, more preferably meta-phenylene diamine.

The composite crosslinked polyamide membrane can be prepared by techniques known in the prior art. Conveniently, interfacial polymerization of an aqueous amine applied to a microporous substrate with an acyl halide in an organic solution, such as described in U.S. Pat. No. 4,277,344, can be employed and is incorporated herein by reference. Preferred as an organic solvent is an aliphatic hydrocarbon, such as hexane, or a chlorofluorocarbon, such as 1,1,2-trichlorotrifluoroethane. Other similar techniques for preparing such membranes are described in U.S. Pat. Nos. 4,606,943; 4,520,044: 4,761,234: 4,772,394: and 4,828,700, and are incorporated herein by reference.

The microporous substrate on which these composite membranes are formed can be any substrate conveniently employed for this purpose. Suitable substrates for composite membranes have been extensively described in the prior art. Illustrative support materials include organic polymeric material such as polysulfone, polyether sulfone, chlorinated polyvinylchloride, styrene/acrylonitrile copolymer, polybutylene terephthalate, cellulose esters and other polymers which can be prepared with a high degree of porosity and controlled pore size distribution. Porous inorganic material may also be operable as supports. Preferably, the surface pores in the support material will have a diameter 2000 Å or less, and the support material will have as high a porosity as is possible, while maintaining the desired pore size, integrity, and strength. Especially preferred as support layers are porous polysulfone films. These films are generally cast on non-woven fabric or woven cloth in the manner described in U.S. Pat. No. 4,277,344. Surface active agents may be employed in the aqueous amine solution to enhance wetting of a hydrophobic substrate.

Especially preferred as membranes to be treated by the method described herein are the membranes disclosed in U.S. Pat. No. 4,277,344. In preferred embodiments, these membranes are prepared by interfacial polymerization of meta-phenylene diamine and trimesoyl chloride. Such membranes are sold by FilmTec Corporation under the designation FT30 membranes.

In one embodiment of the invention, the membrane may be derived from amine reactants or acyl halide reactants which are polymeric. For example, a polymer made by reaction of a difunctional aromatic amine with trimellitic anhydride acid halide optionally mixed with trimesoyl halide, as described in U.S. Pat. No. 4,606,943, is operable as the amine reactant, but is not preferred.

The polyamide of the membrane discriminating layer is crosslinked. These polyamides preferably have a crosslink density of at least about 10 crosslinks, more preferably at least about 50 crosslinks, per 100,000 molecular weight. The crosslink density can be determined by standard end-group analysis techniques and may be estimated by the insolubility or swelling of the resulting polyamide in solvents in which linear polyamides are soluble.

The rejection by the polyamide reverse osmosis membrane of specific solutes and the water flux of the membrane prior to treatment can operably vary over a wide range. The flux and rejection of specific solutes is determined with reference to test conditions using a specific concentration of solutes at a specific pressure and temperature. Preferably, the membrane to be treated will have a sodium chloride rejection of at least about 90 percent, more preferably 95 percent, and, preferably, a water flux of at least about 12 gallons per square foot per day (gfd), more preferably at least about 15 gfd, when tested using an aqueous 0.2 weight percent sodium chloride solution at a transmembrane pressure of 200 lbs /sq. inch (psi) at 25° C. Membranes having a higher salt rejection and useful with a seawater feed at a pressure of 800 psi at 25° C. with a flux of at least 10 gfd may also be treated. Membranes having a much higher flux and lower salt rejection prepared as described in U.S. Pat. No. 4,765,897, which is incorporated by reference, can also be employed.

The membrane may be in the form of a flat sheet, tubular or hollow fiber configuration. The membrane can be treated either prior to or after assembly into an element. In one especially preferred embodiment, the membrane is fabricated into a spiral membrane device and then treated by the method of this invention to produce a membrane element having enhanced rejection of both sulfuric acid and certain organic compounds.

It is found that the membranes to be treated by the method of this invention are advantageously clean. In this context a "clean" membrane is a membrane which has not been subject to extensive service wherein the membrane flux or performance has been reduced by fouling. It has been found that membranes which are freshly prepared and have been subjected to only a brief test, (preferably less than 24 hours, more preferably less than 1 hour) to determine initial reverse osmosis performance or no test prior to treatment are particularly suitable for the treatment of this invention. Membranes which have been in service for an extended time and then are cleaned by standard techniques after being fouled are not readily susceptible to treatment by the method of this invention.

The reagent employed in treating the composite crosslinked polyamide membrane is reactive with hydrogens on primary or secondary amines at the conditions employed for treatment. This reaction is a substitution reaction. The reagent is preferably selected from the group consisting of an organic halogen compound which will alkylate primary amines at conditions of treatment herein, a carboxylic acid anhydride, a carboxylic acid ester, a compound having a reactive ethylenically-unsaturated moiety, or a 1,3-heterocyclic sultone. These reagents may be difunctional or more highly functional compounds in which case some additional crosslinking may be introduced into the desalinizing layer by the treatment. More preferably, the reagents are monofunctional. The reagent may be inertly substituted, which means the reagent may contain moieties in addition to the amine-reactive group, provided said moieties do not interfere with the desired reaction. Preferably, the amine-reactive reagent has a molecular weight of less than about 300, more preferably less than about 150.

The alkylating, organic halogen reagents employed may include those activated by an electron withdrawing group, such as a carboxylic acid group, in the β position. The sodium salt of chloroacetic acid is especially preferred.

Illustrative carboxylic acid anhydride agents include acetic anhydride and propionic anhydride, with acetic anhydride being especially preferred. Illustrative carboxylic acid ester reagents include methyl acetate and ethyl acetate, with methyl acetate being especially preferred.

Ethylenically-unsaturated compounds such as, methacrylic acid, acrylic acid or vinyl sulfonic acid, which have an unsaturated group that reacts with primary or secondary amines, can also be employed. These compounds may be employed in the form of alkali metal salts. Some of these reagents, such as acrylic acid, are also zwitterion precursors at the appropriate pH. By the term "zwitterion precursor" is meant a compound which will react with a primary amine group to form a product containing both a positive and negative charge in the same molecule.

Illustrative of 1,3-heterocyclic sultone reagents are compounds corresponding to the formula:

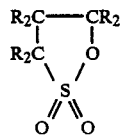

where R at each occurrence is independently H or a $C_1$ to $C_4$ alkyl. Preferably, R at each occurrence is H, except one or two occurrences may be ethyl or methyl groups. R at each occurrence is most preferably H.

The amine-reactive reagents employed herein are believed to react with pendant amine groups remaining in the desalinizing layer to cap or crosslink such groups. A similar reaction was postulated for treatment for such membranes with nitrous acids in U.S. Pat. No. 4,812,238. It is noteworthy that treatment with nitrous acid has also been found to enhance sulfuric acid rejection of these membranes. The present invention is not limited by any specific theory as to how the subject reagents enhance rejection of certain materials by the subject membranes.

The reagent preferably contacts the discriminating layer of the composite crosslinked polyamide membrane while in a liquid diluent. Preferably, this diluent does not deleteriously affect either the discriminating layer or the support layer of the composite membrane. Advantageously, the amine reactive reagent is dissolved in the diluent. The suitability of a diluent will depend upon the specific composition of the desalinizing layer, the nature of the amine reactive agent and the composition of the support. An effective amount of the reagent is employed to impart the desired rejection properties to the membrane after treatment without deleterious affects on the membrane. An aqueous solution of from 0.1 to about 1 percent of the amine-reactive reagent is generally preferred. Diluents other than water may be preferred if water will react with the reagent. Co-solvents can be employed with water but are generally not necessary nor desirable. Suitable co-solvents include the lower alkanols, such as isopropanol or ethanol, and amides, such as N,N-dimethylformamide.

Amine-reactive reagents which react with or hydrolyze in water can be employed in other diluents. For example, acetic anhydride can be employed in an isopropanol diluent.

The time required for the desired properties to be imparted to the membrane will vary dependent on the nature of the desalinizing layer, the identity of the amine-reactive reagent, temperature, concentration of the reagent, and other factors. Preferably, the amine-reactive reagent in water or other diluent should flow continuously over the membrane surface during treatment to replenish the reagent in contact with the surface. Typically, contact times in the range of 0.5 hour to 24 hours or more are desirable. The longer contact times are typically required with reagents of higher molecular weight, which will penetrate the desalinizing layer of the membrane slowly.

Illustrative reactions with the membrane by the reagents may involve ring opening, as well as acylation or alkylation reactions. These different chemical modifications will not necessarily affect rejection of all solutes in the same manner. Rejection of some solutes may be enhanced after treatment while rejection of other solutes may decrease.

The temperature during treatment of the membrane is desirably maintained so as to avoid deleterious affects on the membrane. Too high a temperature may reduce flux through and/or solute rejection by the membrane while too low a temperature may lead to undesirably long contact times for the treatment. Generally, temperatures in the range from about 15° to about 50° C., preferably about 20° to about 35°, are advantageous.

The treatment is conveniently conducted at atmospheric pressure, but a positive transmembrane pressure differential can optionally be employed.

The treatment of composite, crosslinked, polyamide reverse osmosis membranes described herein can enhance the rejection of specific compounds by such membranes. In particular, the rejection of sulfuric acid, sodium hydroxide, sodium nitrate and various organic compounds, such as isopropanol, can be affected by these treatments. Moreover, the rejection of common salts, such as sodium chloride, may also be enhanced by these treatments. Not all rejections of all compounds are necessarily affected to the same degree by various treatments. Sulfuric acid rejection can frequently be employed to indicate whether or not the treatment has in fact affected rejection of the membrane. Advantageously, the aqueous feed solution contains less than about 4 weight percent sulfuric acid, so as to avoid deleterious effects on the membrane and excessive osmotic pressure. However, it is desirable to evaluate any membrane with the particular stream with which said membrane will be employed in order to determine the effectiveness of this treatment in enhancing rejection of specific solutes.

The following examples are presented to illustrate the invention, but are not otherwise intended to limit the subject invention. All parts and percentages are by weight unless otherwise indicated. Passage of a solute is in percent and is calculated by subtracting the rejection of said solute in percent from 100. Water flux is reported in gallons per square foot (of membrane) per day (gfd). The concentration of the solute in the feed water is specified, as is the pressure of the feed during evaluation of the membrane performance. The temperature of the feed water during these reverse osmosis tests is ambient, generally from 18° to 25° C., and flux data was then normalized to 25° C. using standard conversion tables available for the commercial membrane of the type treated. The membrane used in the examples is a membrane available from FilmTec Corporation under the designation FT30 membrane, unless otherwise indicated.

The FT30 membrane is a composite crosslinked polyamide membrane having a polysulfone support and a desalinizing layer prepared by the interfacial polymerization of meta-phenylene diamine in an aqueous medium with trimesoyl chloride in an organic medium. The FT30 membrane is prepared in accordance with U.S. Pat. No. 4,277,344. If the membrane is dried, it is desirable to treat with a surface active agent prior to drying to make the membrane more readily wettable.

EXAMPLE 1

The FT30 membrane is evaluated in reverse osmosis tests employing four different aqueous solutions containing either 0.2 percent sodium chloride, 0.2 percent sodium nitrate, 0.2 percent sodium hydroxide, or 1000 parts per million isopropyl alcohol (IPA). Each of these four solutes is evaluated with a feed pressure of 200 pounds per square inch (psi). In addition, a solution of 2 percent sulfuric acid at a feed pressure of 450 psi is evaluated. The results of this evaluation are tabulated as Comparative Experiment 1 in Table 1. The flux and rejection for each of the five feed streams is listed in the table.

A sample of membrane like that used in Comparative Experiment 1 is then treated with a 0.1 percent solution of acetic anhydride in isopropanol for a period of 24 hours at ambient temperature with no pressure applied across the membrane. The treated membrane is then tested with the five feed solutions employed with Comparative Experiment 1. The results of these evaluations are tabulated in Table I.

TABLE I

| Membrane Treatment | 0.2% NaCL at 200 psi | | 0.2% NaNO$_3$ at 200 psi | | 2% H$_2$SO$_4$ at 450 psi | | 0.2% NaOH at 200 psi | | 1000 ppm IPA at 200 psi | |
|---|---|---|---|---|---|---|---|---|---|---|
| | Flux | Solute Passage | Flux | Solute Passage | Flux | Solute Passage | Flux | Solute Passage | Flux | Solute Passage |
| Comparative Experiment 1 | 27 | 2.6 | 27 | 9.1 | 30 | 7.2 | 23 | 20 | 30 | 19 |
| Example 1 | 21 | 2.4 | 21 | 7.3 | 21 | 1.9 | 16 | 15 | 22 | 15 |

It is apparent from Table I that the treatment with acetic anhydride decreased the flux of water through each membrane and also decreased the solute passage through said membrane. The decrease in solute passage for sodium chloride is minimal, but solute passage declines for the other solutes tested ranged from about 20 percent to over 70 percent. The flux declined by about 20 to 30 percent in each of the evaluations.

EXAMPLE 2

A membrane similar to the composite membrane employed in Comparative Experiment 1 is evaluated with a 0.2 percent sodium chloride aqueous solution at 200 psi. The water flux through this membrane (Comparative Experiment 2) is 32 gfd and solute passage is 3.6 percent. A sample of a similar membrane is then treated with a 0.1 percent solution of acetic anhydride in water with a transmembrane pressure of 200 psig for a period of 2 hours. The membrane after treatment exhibits a water flux of 22.3 gfd and a solute passage of 1.4 percent. This illustrates that treatment with acetic anhydride can be employed to raise the sodium chloride rejection of certain crosslinked polyamide composite membranes.

EXAMPLES 3 AND 4

A composite membrane like the one evaluated in Comparative Experiment 1 is tested for solute passage and flux with a 0.2 percent aqueous sodium chloride solution at 200 psi and then a 1000 part per million solution of isopropyl alcohol at 200 psi and a 0.2 percent sodium nitrate solution at 200 psi followed by extended sodium chloride rejection testing for a period of over 450 hours. The results of these reverse osmosis tests are tabulated in Table II as Comparative Experiment 3.

A sample of the membrane like that in Comparative Experiment 3 is then treated with acetic anhydride in a 0.1 percent solution in 90/10 water/isopropyl alcohol for a period of 24 hours at about 25° C. The resulting treated membrane is evaluated with feed streams in the same manner as the membrane in Comparative Experiment 3. The results of this evaluation are tabulated in Table II as Example 3.

In Example 4, a fresh clean sample of a membrane like that in Comparative Experiment 3 is treated with 1,3-propane sultone in a 0.1 percent solution plus 0.1 percent Na$_2$CO$_3$ in 90/10 water/isopropyl alcohol at a temperature of about 25° C. for 72 hours. The resulting membrane was also evaluated in reverse osmosis test in a manner similar to the membrane in Comparative Experiment 3 and results tabulated in Table II.

TABLE II

| RO Test* | Comparative Experiment 3 | | Example 3 | | Example 4 | |
|---|---|---|---|---|---|---|
| | Flux | Sol. Passage | Flux | Sol. Passage | Flux | Sol. Passage |
| 0.2% NaCl at 200 psi initial | 28 | 5 | 19 | 1.4 | 22 | 0.9 |
| 1000 ppm IPA at 200 psi | 30 | 29 | 21 | 15 | 24 | 14 |
| 0.2% NaNO3 at 200 psi | 29 | 14.4 | 20 | 6 | 24 | 2.2 |
| 0.2% NaCl at 200 psi 48 hours | 26 | 3.6 | 24 | 3.5 | 24 | 0.9 |
| 0.2% NaCl 96 hours | 25 | 3.9 | 23 | 2.8 | 24 | 0.8 |
| 0.2% NaCl 120 hours | 21 | 1.9 | 19 | 1.0 | 21 | 0.5 |
| 0.2% NaCl 168 hours | 18 | 1.2 | 16 | 1.0 | 18 | 0.4 |
| 0.2% NaCl 216 hours | 16 | 1.0 | 16 | 0.9 | 17 | 0.4 |
| 0.2% NaCl 288 hours | 16 | 0.8 | 16 | 0.8 | 17 | 0.4 |
| 0.2% NaCl 384 hours | 14 | 0.9 | 14 | 1.0 | 15 | 0.4 |
| 0.2% NaCl 456 hours | 16 | 1.0 | 16 | 1.0 | 17 | 0.5 |
| 0.2% NaCl after cleaning | 19 | 1.2 | 17 | 1.2 | 20 | 0.7 |

Table II illustrates that treatment with acetic anhydride reduces the water flux of the treated membrane but more significantly reduces the solute passage of sodium chloride, isopropyl alcohol, and sodium nitrate through said membrane. In an extended test, the sodium chloride passage after 168 hours converges with that of the membrane in Comparative Experiment 3. In general, some decline in sodium chloride passage with time would be expected by one skilled in the art.

The treatment with 1,3-propane sultone decreases the flux less than the acetic anhydride treatment while reducing the solute passage to a greater degree. The passage of sodium chloride through the membrane remains low throughout extended testing and the flux is comparable to that of Comparative Experiment 3.

EXAMPLES 5-7

A commercially available FT30 membrane is evaluated in Comparative Experiment 4 employing a 0.2 percent aqueous sodium chloride solution at 200 psi, a sulfuric acid solution of pH 1 at 400 psi and a sodium hydroxide solution of pH 12 at 200 psi in three sequential reverse osmosis tests. A sample of membrane like that used in Comparative Experiment 4 is then treated with 0.2 percent acetic anhydride in a water solvent for 20 hours at about 25° C. in Example 5. The treated membrane is then tested sequentially with sodium chloride, sulfuric acid, and sodium hydroxide feed streams like those used in Comparative Experiment 4 and the results are tabulated in Table III.

A sample of a membrane like that employed in Comparative Experiment 4 is treated with 0.1 percent 1,3-propane sultone plus one percent $NaHCO_3$ in water at about 25° C. for 20 hours and evaluated in the same reverse osmosis tests as Comparative Experiment 4. Results of these evaluations are tabulated in Table III as Example 6.

In Comparative Experiment 5, another sample of FT30 membrane is evaluated in reverse osmosis tests using aqueous sodium chloride, sulfuric acid and sodium hydroxide like those employed for Comparative Experiment 4. The results are tabulated in Table III.

In Example 7, a sample of the membrane like that employed in Comparative Experiment 5 is treated with a stirred 0.1 percent 1,3-propane sultone and one percent $NaHCO_3$ aqueous solution at about 25° C. for 24 hours. The membrane is then evaluated using the same three feed streams as used in Comparative Experiment 5. The flux and solute passage of the treated membrane are tabulated in Table III.

TABLE III

| | | | RO Tests | | | | | |
|---|---|---|---|---|---|---|---|---|
| | | | 0.2% NaCl at 200 psi | | H2SO4 (pH 1) at 400 psi | | NaOH (pH 12) at 200 psi | |
| Comparative Experiment | Example | Treatment | Flux | Solute Passage | Flux | Solute Passage | Flux | Solute Passage |
| 4 | — | Control | 25 | 3.1 | 18 | 24 | 28 | 8.4 |
| — | 5 | 0.2% acetic anhydride | 18 | 1.8 | 11 | 4.8 | 21 | 7.4 |
| — | 6 | 0.1% 1,3-propane sultone | 19 | 0.7 | 14 | 6.3 | 30 | 2.9 |
| 5 | — | Control | 33 | 4.3 | 33 | 14 | 35 | 15 |
| — | 7 | 0.1% 1,3-propane sultone | 18 | 1.4 | 22 | 5.8 | 24 | 4.7 |
| 6 | — | Lab formed FT-30 control | 14 | 0.8 | 24 | 7 | 21 | 4.8 |

In Comparative Experiment 6, a membrane is formed by immersing by hand a polysulfone microporous support in aqueous meta-phenylene diamine and then treating said support with trimesoyl chloride in a 1,1,2-trichlorotrifluoroethane solvent at ambient temperature. The resulting laboratory-produced membrane was evaluated in reverse osmosis test as tabulated in Table III. It is interesting to note that the lab-prepared membrane without any treatment displays lower flux and lower solute passage than the commercially available membrane in Comparative Experiments 4 and 5. The treatment in Example 7 attains lower solute passages for sulfuric acid and sodium hydroxide then the membrane from which it was prepared. Likewise, the membranes of Examples 5 and 6 display lower flux and lower solute passages for both sulfuric acid and sodium hydroxide then the membrane of Comparative Experiment 4. The effects of these treatments on sodium chloride rejection are not as dramatic.

EXAMPLES 8-14

A control sample of FT30 membrane was evaluated with two separate feed streams for reverse osmosis performance. The first stream contained 0.2 percent sodium chloride in an aqueous solution at a pressure of 200 psi and a second feed stream of 0.2 percent sodium nitrate at a feed pressure of 200 psi. Two separate membranes were evaluated and the results are tabulated in Table IV in Comparative Experiments 7 and 8.

In Example 8 a sample of the membrane like that evaluated in Comparative Experiment 7 is treated with an aqueous 0.2 percent solution of 1,3-propane sultone for a period of 20 hours at about 25° C. The water flux and solute passage with the sodium chloride and sodium nitrate solutions are determined and the results are tabulated in Table V.

In Example 9 a 0.2 percent aqueous solution of the sodium salt of methacrylic acid is used to treat a clean sample of a membrane like that evaluated in Comparative Experiment 8 for a period of 20 hours. The water flux and solute passage with sodium chloride and sodium nitrate solutions is determined and is tabulated in Table IV.

In Example 10 a sample of a clean membrane like that evaluated in Comparative Experiment 8 was treated with a 0.2 percent aqueous solution of a sodium salt of vinyl sulfonic acid for 20 hours. The treated membrane is then evaluated with sodium chloride and sodium nitrate and the results are tabulated in Table V.

Examples 8, 9 and 10 demonstrate that significantly reduced solute passages can be obtained by treatment with 1,3-propane sultone, the sodium salt of methacrylic acid and a sodium salt of vinyl sulfonic acid with only minimal, if any, decrease in water flux.

In Examples 11, 12, 13, and 14 samples of clean membrane like that evaluated in Comparative Experiment 9 were treated with the aqueous solutions of reagents as listed in Table IV. These reagents are at concentrations of 0.2 percent in the aqueous solution and the treatment time is 20 hours. The untreated membrane in Comparative Experiment 9 possesses a higher sodium chloride passage than the membrane in Comparative Experiment 8. A greater decrease in flux after treatment with reagents is observed in Examples 11-14 than is observed in Examples 8-10.

TABLE IV

| | | | RO Tests Results | | | |
|---|---|---|---|---|---|---|
| | | | 0.2% NaCl at 200 psi | | 0.2% NaNO$_3$ at 200 psi | |
| Comparative Experiment | Example | Membrane Treatment | Flux | Solute Passage | Flux | Solute Passage |
| 8 | — | Control | 24 | 2 | 25 | 5.6 |
| — | 8 | 1,3-Propane Sultone | 20 | 0.4 | 22 | 1.1 |
| — | 9 | Methacrylic Acid* | 27 | 1.0 | 29 | 4 |
| — | 10 | Vinyl Sulfonic Acid* | 27 | 1.0 | 29 | 4.6 |
| 9 | — | Control | 34 | 5.0 | 37 | 12 |
| — | 11 | Methacrylic Acid* | 19 | 2.1 | 22 | 5.3 |
| — | 12 | Vinyl Sulfonic Acid* | 20 | 1.7 | 23 | 4.3 |
| — | 13 | Acrylamide | 20 | 2.2 | 24 | 5.7 |
| — | 14 | Chloracetic Acid | 21 | 1.6 | 26 | 5 |

*Present as a sodium salt.

EXAMPLES 15 AND 16

A commercially available FT30 membrane is coated with an aqueous solution of 42.5 percent phosphoric acid, the excess acid is then allowed to drain from the surface and the treated membrane dried at a 120° C. until the surface appears visibly dry. This treatment is generally as described in Example 4 of U.S. Pat. No. 4,765,897. The resulting membrane, as depicted in Table V as Comparative Experiment 10, possesses a flux of 33 gfd and solute passage of 70 percent using a 0.2 percent aqueous sodium chloride solution at 100 psi.

A sample of a membrane like that prepared in Comparative Experiment 10 is then treated with a 0.1 percent aqueous solution of 1,3-propane sultone for a period of 20 hours. The resulting treated membrane was tested once again with 0.2 percent sodium chloride at 100 psi and the results are tabulated as Example 15 in Table V. The solute passage was reduced by more than two-thirds and the flux actually increased.

The membrane treated with 1,3-propane sultone was then treated with a colloid of tannic acid in a general manner described in Example 12 of U.S. Pat. No. 4,765,897. The resulting membrane was tested using a 0.2 percent sodium chloride solution at 100 psi. The results are tabulated in Table V as Example 16.

TABLE V

| | | | 0.2% NaCl 100 psi | |
|---|---|---|---|---|
| Comparative Experiment | Example | Treatment | Flux (gfd) | Solute Passage (%) |
| 10 | — | FT-30 coated 42.5% H$_3$PO$_4$ Heated at 120° C. | 33 | 70 |
| — | 15 | 0.1% 1,3-propane sultone | 39 | 22 |
| — | 16 | Example 15 treated with tannic acid | 14 | 6 |

What is claimed is:

1. A method of treating a composite crosslinked polyamide reverse osmosis membrane comprising: enabling the passage through the membrane of H$_2$So$_4$ in a 2 percent aqueous solution at 400 psig and 15° to 35° C. to be reduced by at least about 30 percent relative to the membrane to be reduced by not more than about 5 percent after treatment, by, contacting a composite membrane having a crosslinked polyamide discriminating layer with a solution of an effective amount of an amine-reactive reagent selected from the group consisting of an organic halogen compound which reacts with a primary or secondary amine via an alkylation reaction, a carboxylic acid anhydride, a carboxylic acid ester, a 1,3-heterocyclic sultone having 3 carbon atoms in the ring, and an amine-reactive ethylenically-unsaturated compound.

2. The method as described in claim 1 wherein the polyamide discriminating layer is derived from reactants comprising (a) a compound or polymer bearing at least two primary amine groups and (b) a compound or polymer bearing an average of more than two carboxylic acyl halide groups.

3. The method as described in claim 2 wherein reactant (a) is a phenylenediamine.

4. The method as described in claim 2 wherein (b) is trimesoyl halide, cyclohexane-1,3,5-tricarbonyl halide, mixtures thereof or mixtures of either with isophthaloyl halide or terephthaloyl halide.

5. The method as described in claim 4 wherein (b) comprises at least 50 mole percent trimesoyl halide and (a) is at least 50 mole percent phenylenediamine.

6. The method as described in claim 5 wherein the polyamide discriminating layer is formed by interfacial polymerization of (a) and (b) on a microporous substrate.

7. The method as described in claim 6 wherein (a) comprises at least 50 mole percent m-phenylenediamine and (b) comprises at least 50 mole percent trimesoyl chloride.

8. The method as described in claim 7 wherein the substrate is polysulfone.

9. The method as described in claim 8 wherein the membrane is contacted with an aqueous solution of 1,3-propane sultone.

10. The method as described in claim 8 wherein the membrane is contacted with acetic anhydride.

11. The method as described in claim 8 wherein the membrane is contacted with methacrylic acid or an alkali metal salt thereof.

12. The method as described in claim 8 wherein the membrane is contacted with sodium vinyl sulfonate.

13. The method as described in claim 2 wherein the membrane is contacted with 1,3-propane sultone, acetic anhydride, methacrylic acid, sodium methacrylate or sodium vinyl sulfonate.

14. The method as described in claim 13 wherein the membrane is contacted with 1,3-propane sultone and (a) is m-phenylenediamine and (b) is trimesoyl chloride.

15. A treated composite crosslinked polyamide membrane prepared by a process comprising providing properties which enable the membrane after treatment to have a water flux of at least 50 percent of the membrane prior to treatment and to enable passage of $H_2SO_4$ in a 2 percent aqueous solution at 400 psig and 25° C. to be refused by at least 30 percent relative to the membrane prior to treatment, by, contacting a crosslinked polyamide discriminating layer of a reverse osmosis composite membrane with a solution of an effective amount of an amine-reactive reagent selected from the group consisting of an organic halogen compound which reacts with a primary or secondary amine via an alkylation reaction, a carboxylic acid anhydride, a carboxylic acid ester, a 1,3-heterocyclic sultone having 3 carbon atoms in the ring, and an ethylenically-unsaturated hydrocarbon.

16. The membrane as described in claim 15 wherein the polyamide discriminating layer is derived from reactants comprising (a) a compound or polymer bearing at least two primary amine groups and (b) a compound or polymer bearing an average of more than two carboxylic acyl halide groups.

17. The membrane as described in claim 16 wherein (b) is a trimesoyl halide, cyclohexane-1,3,5-tricarbonyl halide, mixtures thereof or mixtures of either with isophthaloyl halide or terephthaloyl halide.

18. The membrane as described in claim 16 wherein (b) comprises at least 50 mole percent trimesoyl halide.

19. The membrane as described in claim 18 wherein the polyamide discriminating layer is formed by interfacial polymerization of (a) and (b) on a microporous substrate.

20. The membrane as described in claim 19 wherein (a) comprises at least 50 mole percent m-phenylenediamine.

21. The membrane as described in claim 20 wherein (a) consists essentially of m-phenylenediamine, (b) consists essentially of trimesoyl chloride and the substrate is made from polysulfone.

22. The membrane as described in claim 21 wherein the amine-reactive reagent is 1,3-propane sultone.

* * * * *

UNITED STATES PATENT AND TRADEMARK OFFICE
CERTIFICATE OF CORRECTION

PATENT NO. : 4,960,517

DATED : October 2, 1990

INVENTOR(S) : John E. Cadotte

It is certified that error appears in the above-identified patent and that said Letters Patent is hereby corrected as shown below:

Column 3, lines 57&58, "4,520,044: 4,761,234: 4,772,394: and" should read--

4,520,044; 4,761,234; 4,772,394; and--.

Column 9, Table III, line 19, "3.9" should read --3.0--.

Column 12, line 36, "of $H_2So_4$ in" should read -of $H_2SO_4$ in--.

Column 14, line 7, "to be refused by" should read --to be reduced by--.

Signed and Sealed this

Twenty-third Day of June, 1992

Attest:

DOUGLAS B. COMER

Attesting Officer

Acting Commissioner of Patents and Trademarks